United States Patent
Cunico et al.

(10) Patent No.: US 10,397,175 B2
(45) Date of Patent: Aug. 27, 2019

(54) COMMUNICATION CHANNEL SELECTION AND USAGE

(71) Applicant: International Business Machines Corporation, Armonk, NY (US)

(72) Inventors: Hernan A. Cunico, Holly Springs, NC (US); Jonathan Dunne, Dungarvan (IE); Jeremiah O'Connor, Roscommon Town (IE); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 15/238,210

(22) Filed: Aug. 16, 2016

(65) Prior Publication Data

US 2018/0054412 A1 Feb. 22, 2018

(51) Int. Cl.
*H04L 12/58* (2006.01)
*H04W 4/14* (2009.01)
*G06F 17/27* (2006.01)

(52) U.S. Cl.
CPC .............. *H04L 51/36* (2013.01); *H04L 51/26* (2013.01); *G06F 17/2785* (2013.01); *H04L 51/00* (2013.01); *H04L 51/32* (2013.01); *H04W 4/14* (2013.01)

(58) Field of Classification Search
CPC ................................ H04L 51/00; H04L 51/36
See application file for complete search history.

(56) References Cited

U.S. PATENT DOCUMENTS

| | | | |
|---|---|---|---|
| 6,108,688 A | 8/2000 | Nielsen | |
| 6,175,859 B1 | 1/2001 | Mohler | |
| 8,312,089 B2 * | 11/2012 | Deluca | G06Q 10/107 709/203 |
| 8,392,516 B2 * | 3/2013 | Deluca | G06Q 10/107 709/204 |

(Continued)

FOREIGN PATENT DOCUMENTS

EP 0999509 A1 5/2000

OTHER PUBLICATIONS

"Response-Time Expectations in the Internet Age: How Long is Too Long?," [online] The HTC Blog, High-Touch Communications © 2016, May 27, 2013, retrieved from the Internet: <http://blog.htc.ca/2013/05/27/response-time-expectations-in-the-internet-age-how-long-is-too-long/>, 11 pg.

(Continued)

*Primary Examiner* — Jeong S Park
(74) *Attorney, Agent, or Firm* — Cuenot, Forsythe & Kim, LLC

(57) ABSTRACT

Performing electronic communication between a plurality of devices can include determining, using a processor, a required answer time for an electronic message, determining, using the processor, a plurality of expected response times, wherein each expected response time is specific to a recipient of the electronic message and is specific to one of a plurality of different communication channels, and matching, using the processor, the required answer time to an expected response time. Using the processor, a communication channel can be selected from the plurality of different communication channels based upon the matching. Sending of the electronic message to a device of the recipient can be initiated using the selected communication channel.

20 Claims, 3 Drawing Sheets

(56) References Cited

U.S. PATENT DOCUMENTS

| | | | |
|---|---|---|---|
| 2004/0098583 A1* | 5/2004 | Weber | H04L 63/0492 |
| | | | 713/168 |
| 2006/0031489 A1* | 2/2006 | Marcjan | G06F 21/606 |
| | | | 709/225 |
| 2008/0065736 A1 | 3/2008 | Gross | |
| 2008/0294735 A1* | 11/2008 | Muntermann | H04L 51/14 |
| | | | 709/206 |
| 2009/0119600 A1* | 5/2009 | O'Sullivan | G06Q 10/10 |
| | | | 715/745 |
| 2010/0211592 A1 | 8/2010 | Brownlee | |
| 2011/0058666 A1 | 3/2011 | Salis et al. | |
| 2014/0074952 A1 | 3/2014 | White et al. | |
| 2014/0075331 A1* | 3/2014 | Bhogal | G06Q 10/103 |
| | | | 715/751 |
| 2014/0337448 A1 | 11/2014 | Kline et al. | |
| 2015/0312731 A1 | 10/2015 | Bendi et al. | |

OTHER PUBLICATIONS

Torba, a., "Yes I Saw Your Text, But Don't Expect Me to Respond Instantly." [online] Nov. 11, 2013, retrieved from the Internet: <https://medium.com/@Torbahax/yes-i-saw-your-text-but-dont-expect-me-to-respond-instantly-d800818c8367>, 5 pg.

Avrahami, D. et al., "Responsiveness in Instant Messaging: Predictive Models Supporting Inter-Personal Communication," In Proc. of the SIGCHI Conf. on Human Factors in Computing Systems, Apr. 22, 2006, pp. 731-740.

Tyler, J.R. et al., "When Can I Expect an Email Response? A Study of Rhythms in Email Usage," In Proc. of 8th European Conf. on COmputer Supported Cooperative Work, Sep. 14-18, 2003, ECSCW 2003, pp. 239-258.

\* cited by examiner

| User | Communication Channel | Expected Response Time | Required Answer Time |
|---|---|---|---|
| A | Electronic Mail | 10 | 8 |
| | Instant Messaging | 1 | 1 |
| | Social Networking | 5 | 3 |
| | Video Call | 3 | 2 |
| B | Electronic Mail | 7 | 6 |
| | Instant Messaging | 2 | 1 |
| | Social Networking | 6 | 4 |
| | Video Call | 4 | 2 |
| C | Electronic Mail | 5 | 4 |
| | Instant Messaging | 3 | 1 |
| | Social Networking | 1.5 | 4 |
| | Video Call | 2 | 1 |

COMMUNICATION CHANNEL SELECTION AND USAGE

BACKGROUND

This disclosure relates to the selection and usage of one or more different communication channels for sending electronic messages. Users may communicate using any of a variety of different communication channels. Typically, users have particular expectations as to what constitutes a normal or acceptable response time when sending a message. For example, when sending an electronic mail (email), a sender likely has an expectation as to when a response email should be received from the recipient. Similarly, when sending a text message, the sender likely has an expectation as to when a response text message should be received from the recipient. In some cases, the response time may be based upon social norms. In other cases, the response time may be based upon the personal expectations of the sender. The sender's expectations may differ from one communication channel to another.

SUMMARY

An embodiment of the present invention can include a method for electronic communication between a plurality of devices. The method can include determining, using a processor, a required answer time for an electronic message, determining, using the processor, a plurality of expected response times, wherein each expected response time is specific to a recipient of the electronic message and is specific to one of a plurality of different communication channels, and matching, using the processor, the required answer time to an expected response time. The method can also include selecting, using the processor, a communication channel from the plurality of different communication channels based upon the matching and initiating sending, using the processor, of the electronic message to a device of the recipient using the selected communication channel.

Another embodiment of the present invention can include a system for electronic communication between a plurality of devices. The system can include a processor programmed to initiate executable operations. The executable operations can include determining a required answer time for an electronic message, determining a plurality of expected response times, wherein each expected response time is specific to a recipient of the electronic message and is specific to one of a plurality of different communication channels, and matching the required answer time to an expected response time. The executable operations can also include selecting a communication channel from the plurality of different communication channels based upon the matching and initiating sending of the electronic message to a device of the recipient using the selected communication channel.

Another embodiment of the present invention may include a computer program including a computer readable storage medium having program code stored thereon for electronic communication between a plurality of devices. The program code is executable by a processor to perform a method. The method may include determining, using the processor, a required answer time for an electronic message, determining, using the processor, a plurality of expected response times, wherein each expected response time is specific to a recipient of the electronic message and is specific to one of a plurality of different communication channels, and matching, using the processor, the required answer time to an expected response time. The method can also include selecting, using the processor, a communication channel from the plurality of different communication channels based upon the matching and initiating sending, using the processor, of the electronic message to a device of the recipient using the selected communication channel.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the selection and usage of one or more different communication channels for sending electronic messages (hereafter "messages"). In example embodiments described herein, expected response times (ERTs) and required answer times (RATs) may be established for each of a plurality of different communication channels on a user-specific basis. Upon sending a message from a sender device, the ERTs of the recipient of the message may be compared to the RAT for the message to determine a match. Based upon the matching, a communication channel is selected for the message. The message is sent to device(s) of the recipient using the selected communication channel.

In one or more other embodiments, the message may be sent to a plurality of different recipients. In such embodiments, the selection of a communication channel for sending the message may be performed for each different recipient. As such, the message may be sent to each of a plurality of recipients using a communication channel that is specific to each respective recipient. The selection of a communication channel for sending a message to a recipient may be performed independently of the selection of a communication channel for the same message directed to a different recipient.

In still other embodiments, one or more additional attributes may be evaluated when sending a message. These attributes may relate to, or describe, content of the message, different aspects or characteristics of the recipient(s) of the message, and so forth. The selection of a communication channel over which to send the message to each recipient may also be made based upon these additional attribute(s). Further, in another aspect, a Quality of Service (QOS) operation may be applied or performed for the message based upon one or more of the aforementioned attributes.

Figure 1:
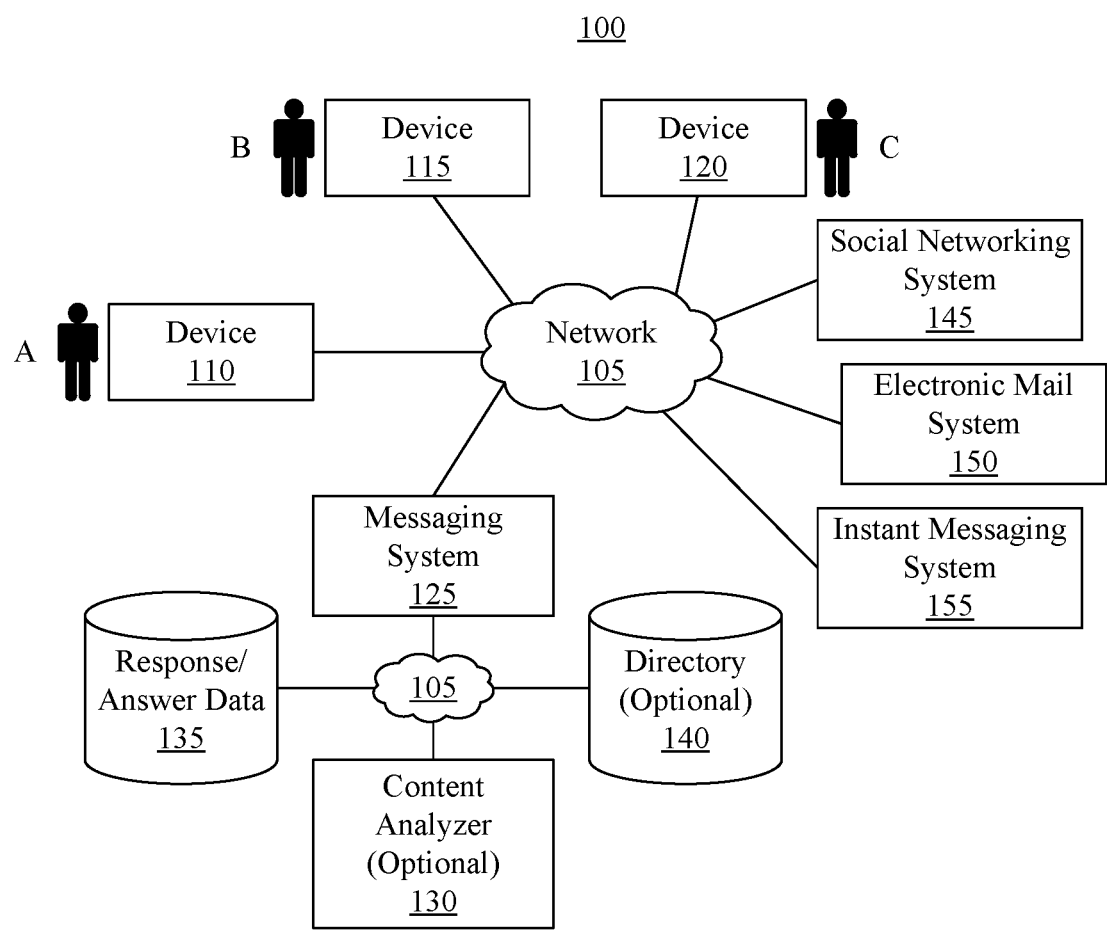
FIG. 1 illustrates an example of a network computing system.

FIG. 1 illustrates an example of a network computing system 100 in which the inventive arrangements may be implemented. Network computing system 100 contains a network 105, devices 110, 115, and 120, a messaging system 125, an optional content analyzer 130, a data storage device 135 storing response/answer (RA) data, and an optional data storage device 140 storing a directory. The noted elements are interconnected, e.g., communicatively linked, by network 105.

Network 105 is the medium used to provide communications links between various devices and data processing systems connected together within network computing system 100. Network 105 may include connections, such as wired communication links, wireless communication links, or fiber optic cables. Network 105 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Devices 110, 115, and 120 are capable of coupling to network 105 via wired and/or wireless communication links. Devices 110, 115, and/or 120 may be implemented as personal computers, portable computing or communication devices, network computers, tablet computers, mobile phones, or the like. Further, device 110 may be implemented as one type of device, while device 115 is implemented as another different type of device, while device 120 is implemented as yet another different type of device. Devices 110, 115, and 120 may exchange messages with one another using messaging system 125.

As defined herein, the term "message," means any of a variety of messages that are capable of being sent and/or received through network 105. Examples of messages, e.g., electronic messages, include, but are not limited to, electronic mail (email), instant messages, short message service (SMS) messages, posts to a Website and/or social networking platform, a call whether a Voice Over IP (VoIP) call, a video call, etc.

Messaging system 125 is capable of coupling to network 105 via wired and/or wireless communication links. In one aspect, messaging system 125 is implemented as one or more interconnected computer systems, e.g., servers. Messaging system 125 is capable of executing suitable operational software to support the various operations described herein. In one embodiment, messaging system 125 is capable of receiving a message formatted for a first communication channel, format converting or translating the message into a format for a second or more different communication channels, and sending the resulting message via the different communication channels to one or more recipients.

For example, messaging system 125 is capable of interacting with social networking system 145, email system 150, and instant messaging system 155 (collectively "communication channels") to analyze messages received by the respective systems and perform the messaging handling operations described herein. Messaging system 125 is capable of format converting messages received on a first communication channel to a format or formats for sending on one or more of the (other) communication channels. Messaging system 125 is capable of sending the format converted messages using the selected communication channels.

Content analyzer 130, which is optional, is capable of coupling to network 105 via wired and/or wireless communication links. Content analyzer 130 may be implemented as one or more interconnected computer systems, e.g., servers. Content analyzer 130 is capable of performing content analysis upon messages received and/or processed by messaging system 125 to determine the content of the messages.

In one embodiment, content analyzer 130 is capable of performing Natural Language Processing (NLP) on messages. NLP is a field of computer science, artificial intelligence, and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency.

Data storage device 135 and optional data storage device 140 are capable of coupling to network 105 via wired and/or wireless communication links. Data storage devices 135 and 140 may be implemented as data processing systems such as servers, as network addressable storage devices or nodes, etc. RA data stored within data storage device 135 specifies an ERT and a RAT for each of a plurality of users, e.g., users A, B, and C, and for each of a plurality of different communication channels for each of the plurality of users. An ERT (expected response time) is an amount of time starting from when a message is sent by a sender or received by a recipient to when a response to the message is expected to be sent by the recipient or received by the sender of the original message. An RAT (required answer time) is an amount of time that a sender expects to pass before an answer to a message is received from the recipient. The directory stored within data storage device 140 may specify a list of users, e.g., users A, B, and C, and one or more attributes for one or more or each of the users. Examples of the attributes that may be stored in the directory include, but are not limited to, the role or position of a user within an organization (e.g., an organizational chart), the expertise of a user (e.g., domains of expertise, subject matter expertise), seniority, and so forth.

One or more communication systems (e.g., communication channels) such as social networking platform 145, email system 150, and instant messaging system 155 may also be coupled to network 105 through wired and/or wireless communication links. As defined herein, the term "communication channel" means a mode of communication using one or more electronic devices. A communication channel is associated with a specific format and/or communication protocol for sending messages. For example, a mobile device is capable of sending a message to another mobile device using instant messaging, SMS, email, as a video call, a voice call, or as a post to a social networking system. Each of instant messaging, SMS, email, video calls, voice calls, and posts to a social networking system is considered a different communication channel.

It should be appreciated that one or more additional communication channels (e.g., communication systems) not shown in FIG. 1 may be included and interact with messaging system 125. For example, an SMS system may be included. A call system may be included. The list of communication channels provided herein and used as examples is not intended to be limiting of the inventive arrangements described herein.

Social networking system 145 is implemented as one or more interconnected computer systems, e.g., servers. As defined herein, a "social networking system" is a computing platform that allows users to build social networks or social relations among people who share similar interests, activities, backgrounds or real-life connections. Through a social networking system, users may send communications through different mechanisms such as by posting messages or other media, commenting on messages, posts, or other media, replying to messages, and performing other operations such as "liking" a communication or item of media, sharing the communication or item of media, expressing an emotional sentiment, and so forth. In the context of a social networking system, actions such as posting, replying, liking, sharing, expressing sentiment, and so forth are programmatic actions that are monitored and persisted within social the networking system, e.g., within a data storage device in a data structure within and/or accessible by, the social networking system.

In one example embodiment, a sender (e.g., user A of device 110) composes a message using device 110. For purposes of illustration, the message is created, at least initially, for sending via a first communication channel such as email. Further, for purposes of illustration, the message is directed to user B (e.g., device 115) as the recipient.

Messaging system 125 is capable of analyzing the message. In one aspect, messaging system 125 is capable of analyzing the message from email system 150 (or other communication system). Messaging system 125 is capable of accessing RA data within data storage device 135 to analyze the message. In one aspect, messaging system 125 determines the ERTs for a plurality of different communication channels for the recipient, e.g., user B, of the message. Messaging system 125 is capable of comparing the ERTs of user B to an RAT for the message. In this example, the RAT for the message corresponds to the sender of the message. Messaging system 125 is capable of comparing the RAT with the ERTs and matching the RAT to a particular ERT, as described below in greater detail. Messaging system 125 further is capable of converting the message from the format for the first communication channel to a different format of the matched ERT for the recipient and sending the converted message over the different communication channel of the matched ERT. For example, messaging system 125 may format convert the message and send the message to the recipient using social networking system 145 or instant messaging system 155.

In one embodiment, where the message is directed to a plurality of different recipients such as users B and C (e.g., devices 115 and 120), messaging system 125 is capable of determining or selecting a particular communication channel to be used to send the message to each intended recipient. Messaging system 125 is capable of sending the message to user B using a same or different communication channel as is used to send the message to user C.

In another embodiment, messaging system 125 is capable of determining one or more attributes of the recipient(s) of a message from the directory stored in data storage device 140. Messaging system 125 is capable of selecting the particular communication channel(s) to be used to send a message to the recipient(s) based upon the comparison of the ERTs and RAT and further based upon one or more of the attributes of the recipients as will be described herein in greater detail.

In yet another embodiment, content analyzer 130 is capable of determining content of the message. As used herein, the term "content" means the subject matter of a message. Content analyzer 130 may provide the content of the message to messaging system 125. Messaging system 125 is capable of selecting the particular communication channel(s) to be used to send a message to the recipient(s) based upon a comparison of the ERTs and RAT, optionally using one or more attributes of the recipients, and optionally using the content as determined by content analyzer 130. In another example embodiment, messaging system 125 is capable of applying or performing a QOS operation to the message based upon the content of the message.

FIG. 1 is provided for purposes of illustration and is not intended to limit the inventive arrangements described herein. It should be appreciated that network computing system 100 may include fewer elements than shown or more elements than shown. For example, network computing system 100 may include fewer or more servers, clients, and other devices. In addition, one or more of the elements illustrated in network computing system 100 may be merged or combined. For example, content analyzer 130 may be incorporated into messaging system 125. Data storage devices 135 and 140 may be combined into a single data storage device. In other embodiments, the data storage devices 135 and 140 may be included within messaging system 125.

In addition, while the example embodiments provided within this disclosure are illustrated using a centralized messaging system, e.g., messaging system 125, in one or more other embodiments, the operations attributed to messaging system 125 may be performed by a sending device. For example, device 110 may perform the operations attributed to messaging system 125 as part of sending a message.

Figures 2, 3:
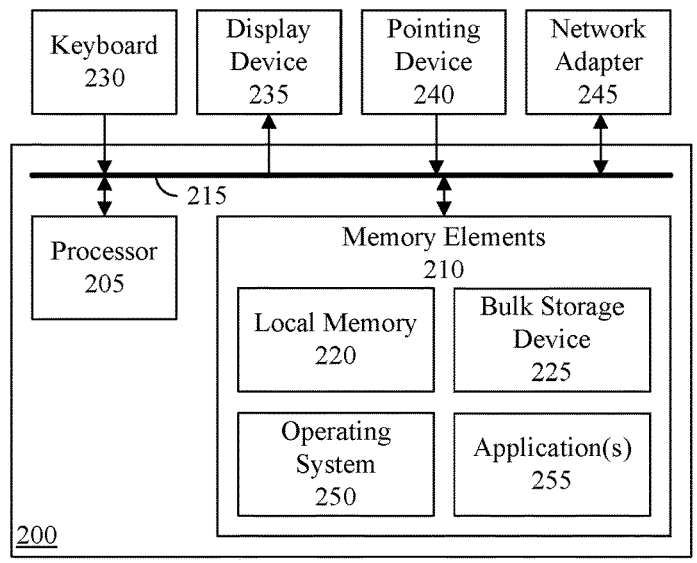
FIG. 2 illustrates an example of an architecture for a data processing system.
FIG. 3 illustrates example response/answer data for use in selecting communication channels for sending messages.

FIG. 2 illustrates an example architecture 200 for a data processing system. Architecture 200 may be used to implement a device that is suitable for storing and/or executing program code. In one aspect, for example, architecture 200 may be used to implement messaging system 125, device(s) 110, 115, and/or 120, and/or content analyzer 130 of FIG. 1.

Architecture 200 includes at least one processor 205, e.g., a central processing unit (CPU), coupled to memory elements 210 through a system bus 215 or other suitable circuitry. Architecture 200 stores program code within memory elements 210. Processor 205 executes the program code accessed from memory elements 210 via system bus 215. In one aspect, architecture 200 may be used to implement a computer or other data processing system that is suitable for storing and/or executing program code. It should be appreciated, however, that architecture 200 may be used to implement any system including a processor and memory that is capable of performing the functions described within this disclosure.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 also may include one or more cache memories (not shown) that provide temporary storage of at least some program code in order to reduce the number of times program code must be retrieved from the bulk storage device during execution.

Input/output (I/O) devices such as a keyboard 230, a display device 235, a pointing device 240, and one or more network adapters 245 optionally may be coupled to architecture 200. The I/O devices may be coupled to architecture 200 either directly or through intervening I/O controllers. Architecture 200 may include one or more additional I/O device(s) beyond the examples provided. In some cases, one or more of the I/O device(s) may be combined as in the case where a touch sensitive display device 235 (e.g., a touchscreen) is used. In that case, display device 235 may also implement keyboard 230 and/or pointing device 240.

Network adapter 245 is a communication circuit configured to establish wired and/or wireless communication links with other devices. The communication links may be established over a network or as peer-to-peer communication links. Accordingly, network adapter 245 enables architecture 200 to become coupled to other systems, computer systems, remote printers, and/or remote storage devices through intervening private or public networks. Example network adapter(s) 245 may include, but are not limited to, modems, cable modems, Ethernet cards, bus adapters, connectors, ports, and so forth. Other examples of network adapter 245 may be a wireless transceiver and/or a wireless radio. Network adapter(s) 145 may be configured for short and/or long range wireless communications.

Memory elements 210 store an operating system 250 and an application 255. Operating system 250 and application 255, being implemented in the form of executable program code, are executed by architecture 200. As such, operating system 250 and/or application 255 may be considered an integrated part of any system implemented using architecture 200. Application 255 and any data items used, generated, and/or operated upon by architecture 200 while executing application 255 are functional data structures that impart functionality when employed as part of architecture 200.

As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

In the case where architecture 200 is used to implement a server type of data processing system, operating system 250 may be a server-side operating system; and, application 255 may be a server-side application that, when executed, causes the server to perform the various operations described herein. In the case where architecture 200 is used to implement a device such as device 110 of FIG. 1, operating system 250 may be a client-side operating system; and, application 255 may be a client-side application that, when executed, causes the client to perform the various operations described herein.

FIG. 3 illustrates example RA data that may be stored and used to select communication channels for sending messages. The RA data, for example, may be stored within a data structure that is accessible by the messaging system. The example of FIG. 3 shows RA data for users A, B, and C. For each of users A, B, and C, an ERT and a RAT is specified for each of a plurality of different communication channels.

In one embodiment, each of users A, B, and C is capable of specifying an RAT for the various types of communication channels within the RA data. The RATs may be specified by users manually in advance of sending messages, e.g., as part of a profile, and be stored for subsequent use. In another embodiment, the users may specify an RAT for a message at the time of message creation or composing. The latter example allows a sender to specify an RAT for a message on a per message basis for messages being sent using a same communication channel. In yet another aspect, users may specify default RATs for communication channels and may override the default RAT for a given communication channel by providing a new RAT when composing and/or sending a message.

In one embodiment, the ERTs may be specified manually by users. In another embodiment, the ERTs may be calculated automatically by the messaging system. For example, the messaging system may evaluate the elapsed time between a recipient receiving a message (or a sender sending a message) via a particular communication channel and the recipient providing a response to the received message. The messaging system is capable of calculating an average response time on a per user and on a per communication channel basis. The messaging system is capable of updating the ERTs on an ongoing basis automatically.

Referring to the example shown in FIG. 3, user A has an ERT for email of 10 minutes, an ERT for instant messaging of 1 minute, and an ERT for social networking of 5 minutes. Consider an example where user B sends user A an email. User B has an RAT for email of 6 minutes. The ERT for email for user A, however, is 10 minutes, which exceeds the RAT for email for user A. In one example embodiment, the messaging system is capable of receiving the email from user B and determining that the ERT for email for user A exceeds the RAT for the message. In this example, the RAT for the message is the RAT for the sender for the initial communication channel used by the sender to send the message. In this case, the initial communication channel is email.

In response to determining that the RAT of the message exceeds the ERT for the initial communication channel, the messaging system selects a different communication channel having an ERT that matches the RAT of the message. In this example, matching means that the ERT does not exceed the RAT. Thus, the messaging system determines that each of instant messaging, social networking, or video call have an ERT that does not exceed the RAT of 6. The messaging system is capable of selecting a particular communication channel based upon the comparison and/or matching of the RAT of the message with the ERTs of the recipient of the message.

In one or more embodiments, the behavior of the message system may be determined using a set of rules. In one aspect, rules may specify default behavior of the messaging system. In another aspect, rules may specify selectable messaging handling options that a sender may select upon sending a message to control the behavior and messaging handling implemented by the messaging system. For example, a particular type of message handling may be selected by a user through the client application executing on the user's device. The type of message handling selected specifies one or more rules that, when executed by the messaging system, define how messages are handled. For example, the rules may specify particular conditions that must exist to match an ERT or ERTs to an RAT of a message and/or may define the effect, if any, of the content of a message and/or the attributes of the recipients on communication channel selection and/or application of a QOS operation.

The following are examples of different types message handling that may be performed by the messaging system through selection and application (e.g., execution) of rules. One or more of the examples described herein may be set as default message handling for the messaging system, while one or more other examples may be selected by a user to override such default behavior for handling a given message.

In one example, the messaging system is capable of selecting the fastest communication channel. Referring to the prior example, a rule may cause the messaging system to send the message to user A using instant messaging.

In another example, a rule may cause the messaging system to select the communication channel that has the highest ERT that does not exceed the RAT of the message. Referring to the prior example, such a rule would cause the messaging system to send the message to user A using social networking, e.g., as a post or message within the social networking platform, instead of using instant messaging.

In the case of a message directed to more than one recipient (e.g., user B sends a message to both user A and to user C), a rule may cause the messaging system to select a communication channel for sending the message to user A and select a communication channel for sending the message to user C. The communication channel(s) selected may or may not be different. In another example, where user B sends an email to users A and C, a rule may cause the messaging system to select instant messaging as the communication channel for user A as the fastest option for user A and select social networking for user C as the fastest option for user C.

In another example, a rule may cause the messaging system may select a communication channel having the lowest ERT of the recipients and use that communication channel for sending the message to each of the recipients. Referring to the prior example, the messaging system may choose social networking as the communication channel to send the message to both user A and to user C since the ERT for user C is 1.5 and is the lowest (fastest) ERT of any communication channel available for users A and C as recipients of the message.

In another example, a rule may cause the messaging system to select a communication channel or communication channels having a slower response. For example, consider the case where user B sends a work related instant message to users A and/or C on Friday evening and does not require a response until Monday morning. A rule (e.g., selected by user B upon sending the message) may cause the messaging system to send the message using communication channels with longer response times. The messaging system may send the message to user A using email and to user C also using email since email has the largest ERT for each of users A and C.

In another example, a rule may cause the messaging system to apply a QOS operation such as encryption, signature verification, etc. to a message based upon content of the message. The rule(s) may indicate that messages directed to particular subjects or content as determined by the content analyzer may need to be encrypted, may need to be sent over particular communication channels, may require signature verification, and so forth.

In another example, a rule may cause the messaging system to select a particular communication channel according, at least in part, to attributes of the recipients of the message. The rule(s) may indicate that messages directed to a particular recipient, or particular recipients, be sent using a particular communication channel. As an illustrative example, a message sent to a recipient that is a supervisor (per the directory) or that has a particular seniority level (per the directory) may require that the message be archived and, as such, be sent using email as opposed to another communication channel such as instant messaging that may not be archived. Similarly, the message may require a particular QOS that is only available on a particular communication channel. Encryption and/or signature verification, for example, may be available on email, but not social networking. Thus, if the rules indicate that per the attribute(s) of the recipients and/or the content of the message requires a particular QOS, the messaging system selects a communication channel that offers the required QOS.

In one or more other embodiments, where more than one communication channel meets the ERT to RAT matching for one or more recipients, the attributes of the recipients and/or content of the message may be used to select particular communication channels from among those that qualify from the ERT to RAT matching.

In another example, a rule may cause the messaging system to choose faster communication channels for one or more recipients of a message while choosing a slower communication channel for one or more other recipients of the message. As an illustrative example, a sender may choose a rule that causes the messaging system to select a communication channel having a lowest ERT for a particular user having expertise in the subject matter (domain) of the message as determined by the content analyzer, while selecting communication channels having slower ERTs for others included as recipients of the message. In that case, for example, the messaging system is capable of determining the domain of the message and choosing the communication channel with the lowest ERT also below the RAT of the message for a recipient having an expertise matching the determined domain. The messaging system is capable of choosing communication channels having higher ERTs for other recipients that do not have expertise in the domain of the message. The ERTs for the other recipients may or may not be below the RAT of the message.

The foregoing examples are provided for purposes of illustration only and, as such, are not intended to limit the inventive arrangements described herein. It should be appreciated that the rules may incorporate one or more or all of the aspects described herein. The rules executed by the messaging system in performing message handling may select a communication channel for a message on a per recipient basis based upon a comparison of ERTs to the RAT of the message, attributes of the recipients, content of the message, and/or any combination or sub-combination of the foregoing.

Figure 4:
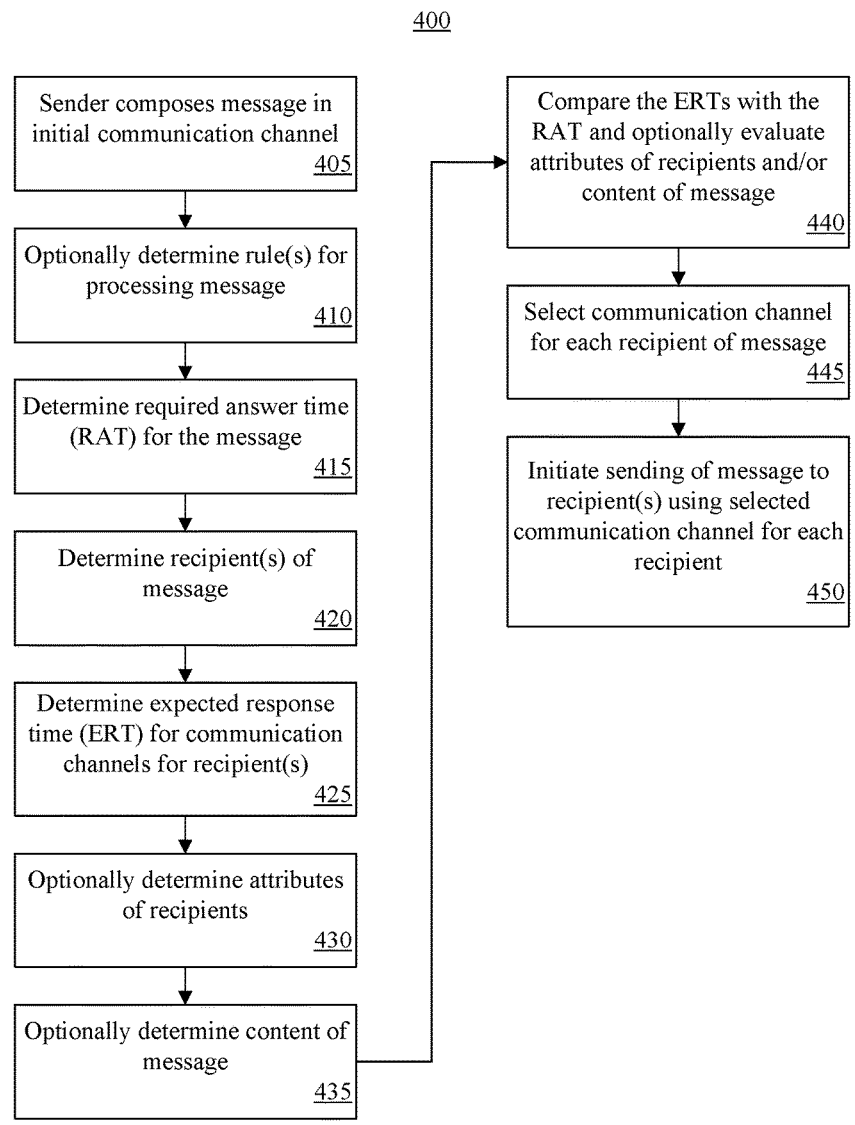
FIG. 4 illustrates an example of a method of communication channel selection and usage.

FIG. 4 illustrates an example of a method 400 of communication channel selection and usage. Method 400 is performed by a data processing system as described herein. While method 400 is described as being performed by a messaging system, it should be appreciated that the operations may be performed by a device such as device 110 of FIG. 1. In one or more other embodiments, the messaging system may be integrated within one or more other communication systems such as an email system, an instant messaging system, or the like.

In block 405, a sender composes a message. The message is formatted for sending over an initial, or first, communication channel. For example, using a device with suitable operational software, e.g., a messaging client, the user may compose a message to be sent via a particular communication channel. For purposes of illustration, the user may compose an email.

In block 410, the messaging system optionally determines the rule(s) for processing the message. In one example, the system utilizes default rules for messaging processing. In another example, the system determines rules as specified or selected by a user as part of sending the message. For example, in creating the message, the sender may select a particular type of message handling to be applied by the messaging system.

In block 415, the messaging system determines the RAT for the message. The messaging system, for example, receives the message, identifies the sender of the message, and identifies the communication channel of the message. Accordingly, the messaging system is capable of reading the RAT for the message from the RA data using the sender and the communication channel of the message. As discussed, the system may access other communication systems to obtain copies of messages for performing the analysis described herein. Further, the routine handling or delivery of a message received by such other systems may be interrupted and/or paused pending the analysis performed by the messaging system and determination of potentially different communication channels for sending the message.

In block 420, the messaging system determines the recipient(s) of the message. In block 425, the messaging system determines the ERTs for the message for the various communication channels available for the recipients from the RA data. In block 430, the messaging system optionally determines attributes for the recipients. For example, the messaging system may determine attributes by reading entries in the directory for the recipients of the message. In block 435, the messaging system optionally determines the content of the message. As discussed, the content analyzer may determine the content, e.g., the subject or domain, of the message and provide the determined content to the system.

In block 440, the messaging system is capable of comparing the ERTs with the RAT and selecting an ERT for each recipient that matches the RAT per the rule(s) being utilized to process the message. In one or more additional or alternative embodiments, the messaging system is also capable of evaluating the attributes and/or content of the message in accordance with the rules. As discussed, utilizing content and/or attributes may be optional and may be performed as specified in applicable rules.

In block 445, the messaging system selects a communication channel for each recipient of the message. The selection of a communication channel for each recipient is performed based upon the rules using the ERTs, RAT, the recipient attributes, content of the message, or any combination thereof. In block 450, the messaging system initiates sending of the message to the recipient(s) of the message (e.g., devices of the recipients) using the selected communication channel for each respective recipient. As part of block 445 or 450, the messaging system, prior to sending the message, performs any format conversions and/or translation of the message from one format to another so that the message may be sent using the selected communication channel for each respective recipient of the message.

In one aspect, the messaging system itself may be capable of receiving and/or sending messages using any of the example communication channels described herein. In another aspect, the messaging system may provide the message, once format converted, to the various selected communication systems for sending by such communication systems. The messaging system may provide the format converted messages to the appropriate communication channel(s) (communication system(s)) for sending to the recipient(s).

The example embodiments described within this disclosure provide methods, systems, and machine readable storage devices that are configured for analyzing a message and determining which communication channel will return a response, whether the most immediate response or a response that complies with a selected messaging handling rule or rules. In one or more embodiments, a plurality of users may define ERTs and RATs for various communication channels. When a user sends a message, communication channel(s) are selected for sending the message based upon ERTs, RATs, the pairing of the sender and one or more intended recipients of the message, and so forth.

In one or more embodiments relating to group communication, in response to determining that the ERTs of recipients of a message exceed the RAT of the message (and of the sender), the system may determine which recipient of the message is capable of replying to the message most expeditiously and select the communication channel with the most expeditious response (ERT) for that recipient. The system may format convert the message and send the message to the recipient (or each recipient of the group) using the selected communication channel.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/ dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of electronic communication between a plurality of devices, comprising:
   determining, using a processor, a required answer time for an electronic message;
   determining, using the processor, a plurality of expected response times, wherein each expected response time is specific to a recipient of the electronic message and is specific to one of a plurality of different communication channels;
   matching, using the processor, the required answer time to an expected response time;
   selecting, using the processor, a communication channel from the plurality of different communication channels based upon the matching; and
   initiating sending, using the processor, of the electronic message to a device of the recipient using the selected communication channel.

2. The method of claim 1, wherein the electronic message is directed to a plurality of recipients and the selecting of a communication channel is performed on a per recipient basis.

3. The method of claim 1, wherein the required answer time is specific to a sender of the electronic message and a communication channel used by a sending device to send the message.

4. The method of claim 1, further comprising:
   analyzing, using the processor, content of the electronic message;
   wherein the selecting the communication channel from the plurality of different communication channels is further based upon the content of the electronic message.

5. The method of claim 4, wherein a communication channel ranked more secure is selected over a less secure communication channel based upon the content of the electronic message.

6. The method of claim 4, further comprising:
   applying a quality of service operation to the electronic message based upon the content of the electronic message.

7. The method of claim 1, further comprising:
   determining an attribute of the recipient of the electronic message;
   wherein the selecting the communication channel from the plurality of different communication channels is further based upon the attribute of the recipient.

8. A system for electronic communication between a plurality of devices, comprising:
   a processor programmed to initiate executable operations including:
   determining a required answer time for an electronic message;
   determining a plurality of expected response times, wherein each expected response time is specific to a recipient of the electronic message and is specific to one of a plurality of different communication channels;
   matching the required answer time to an expected response time;
   selecting a communication channel from the plurality of different communication channels based upon the matching; and initiating sending of the electronic message to a device of the recipient using the selected communication channel.

9. The system of claim 8, wherein the electronic message is directed to a plurality of recipients and the selecting of a communication channel is performed on a per recipient basis.

10. The system of claim 8, wherein the required answer time is specific to a sender of the electronic message and a communication channel used by a sending device to send the message.

11. The system of claim 8, wherein the processor is further programmed to initiate executable operations comprising:
   analyzing content of the electronic message;
   wherein the selecting the communication channel from the plurality of different communication channels is further based upon the content of the electronic message.

12. The system of claim 11, wherein a communication channel ranked more secure is selected over a less secure communication channel based upon the content of the electronic message.

13. The system of claim 11, wherein the processor is further programmed to initiate executable operations comprising:
   applying a quality of service operation to the electronic message based upon the content of the electronic message.

14. The system of claim 8, wherein the processor is further programmed to initiate executable operations comprising:
   determining an attribute of the recipient of the electronic message;
   wherein the selecting the communication channel from the plurality of different communication channels is further based upon the attribute of the recipient.

15. A computer program product comprising a computer readable storage medium having program code stored thereon for performing electronic communication between a plurality of devices, the program code executable by a processor to perform a method comprising:
   determining, using the processor, a required answer time for an electronic message;
   determining, using the processor, a plurality of expected response times, wherein each expected response time is specific to a recipient of the electronic message and is specific to one of a plurality of different communication channels;
   matching, using the processor, the required answer time to an expected response time;
   selecting, using the processor, a communication channel from the plurality of different communication channels based upon the matching; and
   initiating sending, using the processor, of the electronic message to a device of the recipient using the selected communication channel.

16. The computer program product of claim 15, wherein the electronic message is directed to a plurality of recipients and the selecting of a communication channel is performed on a per recipient basis.

17. The computer program product of claim 15, wherein the required answer time is specific to a sender of the electronic message and a communication channel used by a sending device to send the message.

18. The computer program product of claim 15, wherein the method further comprises:
   analyzing, using the processor, content of the electronic message;
   wherein the selecting the communication channel from the plurality of different communication channels is further based upon the content of the electronic message.

19. The computer program product of claim 18, wherein a communication channel ranked more secure is selected over a less secure communication channel based upon the content of the electronic message or applying a quality of service operation to the electronic message based upon the content of the electronic message.

20. The computer program product of claim 15, wherein the method further comprises:
   determining an attribute of the recipient of the electronic message;
   wherein the selecting the communication channel from the plurality of different communication channels is further based upon the attribute of the recipient.

* * * * *